(12) United States Patent
Wintle et al.

(10) Patent No.: US 11,823,201 B2
(45) Date of Patent: Nov. 21, 2023

(54) INTELLIGENT RECURRING TRANSACTION PROCESSING AND FRAUD DETECTION

(71) Applicant: Visa International Service Association, San Francisco, CA (US)

(72) Inventors: Clive Alan Wintle, Surrey (GB); Thomas Purves, San Francisco, CA (US); Prasad Madhukar Gore, Reading (GB); Shipra Jha, Fremont, CA (US)

(73) Assignee: Visa International Service Association, San Francisco, CA (US)

( * ) Notice: Subject to any disclaimer, the term of this patent is extended or adjusted under 35 U.S.C. 154(b) by 210 days.

(21) Appl. No.: 17/168,035

(22) Filed: Feb. 4, 2021

(65) Prior Publication Data

US 2022/0245641 A1    Aug. 4, 2022

(51) Int. Cl.
*G06Q 40/00* (2023.01)
*G06Q 20/40* (2012.01)
(Continued)

(52) U.S. Cl.
CPC ....... *G06Q 20/4016* (2013.01); *G06F 18/214* (2023.01); *G06N 20/00* (2019.01);
(Continued)

(58) Field of Classification Search
CPC .. G06Q 20/4016; G06Q 20/22; G06Q 20/405; G06N 20/00; G06K 9/6256
See application file for complete search history.

(56) References Cited

U.S. PATENT DOCUMENTS 7,970,705 B2    6/2011  Patterson
10,115,166 B2   10/2018 Rephlo
(Continued)

FOREIGN PATENT DOCUMENTS

WO   WO-2010135157 A2 * 11/2010 ............. G06Q 10/06
WO   WO-2014162296 A1 * 10/2014 ........... G06Q 20/102

OTHER PUBLICATIONS

Greenberg, et al., "Machine-Learning System for Recurring Subscription Billing," Technical Disclosure Commons, Defensive Publication Series, 2017 (Year: 2017).*
(Continued)

*Primary Examiner* — Abhishek Vyas
*Assistant Examiner* — William B. Bunker
(74) *Attorney, Agent, or Firm* — Schwabe, Williamson & Wyatt, PC

(57) ABSTRACT

A system for intelligent recurring transaction processing and fraud detection comprises an artificial intelligence (AI) platform including machine learning (ML) models that are in communication with server computers. The servers access historical payment transaction data from a transaction database to train the ML models to predict future recurring transactions. The servers receive an authorization request from an acquirer for a payment transaction by a cardholder using a payment device, process the authorization request to the issuer and transmit a response. Transaction data from the authorization request is input into the ML models to predict whether the payment transaction comprises a recurring payment transaction and if so, determine a predicted date of a next recurring transaction. An API call is initiated to the issuer with transaction attributes regarding the next recurring payment transaction prior to the predicted date, and the issuer sends an alert message directly to the cardholder.

14 Claims, 6 Drawing Sheets

(51) Int. Cl.
*G06N 20/00* (2019.01)
*G06Q 20/10* (2012.01)
*G06Q 20/22* (2012.01)
*G06F 18/214* (2023.01)

(52) U.S. Cl.
CPC ........... *G06Q 20/102* (2013.01); *G06Q 20/22* (2013.01); *G06Q 20/405* (2013.01)

(56) References Cited

U.S. PATENT DOCUMENTS

| | | | |
|---|---|---|---|
| 10,210,515 B2 | 2/2019 | Vienravee | |
| 11,551,292 B2* | 1/2023 | Shihab | G06Q 20/102 |
| 2010/0299230 A1* | 11/2010 | Patterson | G06Q 20/10 |
| | | | 705/30 |
| 2012/0317029 A1* | 12/2012 | Salonen | G06Q 10/02 |
| | | | 705/44 |
| 2013/0197998 A1* | 8/2013 | Buhrmann | H04M 1/27 |
| | | | 726/3 |
| 2015/0206252 A1* | 7/2015 | Rephlo | G06Q 40/12 |
| | | | 705/30 |
| 2016/0224954 A1* | 8/2016 | O'Regan | G06Q 20/322 |
| 2017/0148020 A1* | 5/2017 | Vienravee | G06Q 20/405 |
| 2019/0147448 A1* | 5/2019 | Allbright | G06Q 20/24 |
| | | | 705/77 |
| 2020/0118133 A1* | 4/2020 | Schmidt | G06Q 20/102 |
| 2020/0202315 A1 | 6/2020 | Mohandas | |
| 2020/0286057 A1* | 9/2020 | Desai | G06Q 20/405 |
| 2021/0103922 A1* | 4/2021 | Mossoba | G06F 40/30 |
| 2021/0117952 A1* | 4/2021 | Jumper | G06Q 20/29 |
| 2021/0133698 A1* | 5/2021 | Zhang | G06F 16/23 |
| 2021/0192609 A1* | 6/2021 | Walsh | G06N 20/00 |
| 2021/0357923 A1* | 11/2021 | Walters | G06Q 20/389 |
| 2022/0044261 A1* | 2/2022 | Jumper | G06N 20/00 |
| 2023/0013086 A1* | 1/2023 | Wallace | G06F 16/2453 |

OTHER PUBLICATIONS

Anonymous, "Fighting Back: Ten Ways to Prevent Recurring Billing Chargebacks," Chargify, www.chargify.com 2016 (Year: 2016).*
Kang, et al., Koala—The recurring-subscription management tool that lets you finally take control of your recurring payments and services, Product PowerPoint Presentation, 2020 (Year: 2020).*
Global Payments, "Recurring Transactions Enquiry Service—Merchant Implementation Guide" Jan. 2016; 14 pages.

* cited by examiner

INTELLIGENT RECURRING TRANSACTION PROCESSING AND FRAUD DETECTION

BACKGROUND

Millions of transactions occur daily through the use of payment devices, such as credit cards, debit cards, prepaid cards, etc. and their proxies, e.g. payment tokens. Payment accounts and associated payment devices, such as cards, are typically issued to cardholders to conduct transactions with merchants for good or services. The cardholders may then use their payment devices to pay for goods and services from a variety of different merchants. Upon first use of the card at a particular type of merchant, the cardholder is presented with a choice of having the merchant save the payment account information, so the cardholder does not have to reenter the account information for subsequent transactions. Having merchants save payment account information as a "card on file" is a popular choice for cardholders, particularly for use with recurring payments.

Recurring transactions are payment transactions between a cardholder and a merchant with the payment device where the cardholder gives the merchant authority to periodically (e.g., monthly) charge their card payment account. These charges are for recurring purchases of products or services in many different merchant sectors, such as subscription-type payments for cable subscriptions, movie and TV streaming services, Internet providers, mobile phone contracts, magazine subscriptions, club membership clubs, insurance premiums, and the like.

Historically, direct debit and recurring transactions have been typically processed on ACH (Automated Clearing House) financial networks, with bank accounts being the source of the payment. Also known as "direct payments," ACH payments are a way to transfer money from one bank account to another without using paper checks, credit card networks, wire transfers, or cash.

Over recent years, subscribers increasingly see the advantages of using their payment devices, such as cards, in place of their bank account, or a proxy in the case of debit cards. As the number of card on file type (internet) purchases has increased, the number of recurring and instalment type card transactions has increased, such as for example Amazon Prime™ and Apple iTunes™ subscriptions. At the same time, as the number of recurring type payments has increased, the number of declines for this type of transaction has increased.

For instance, in 2019 Visa processed more than 8 billion recurring authorization transactions through Visa's payment processing network called VisaNet. Of these recurring transactions, two thirds or approximately 5 billion were approved and one third or close to 3 billion were declined. This resulted in approximately 3 billion in lost clearing transactions and associated revenue. Of the declined transactions, almost 2 billion were declined for an "insufficient funds" response code or a "do not honor" response code. Of the remaining 800 million declines, 370 million were on accounts that do not exist or have an invalid account number, and 220 million were on accounts that were lost, stolen, or fraudulent.

Increased rates of declines for recurring transactions results in an increased need to contact the cardholder, e.g. to confirm that the cardholder has requested the payment, or is aware they have a card on file recurring payment that has been set up, increased costs for the issuer to process the authorization payments and increased time in resolving issues associated to cardholder declines. Also, loss of trust for the cardholder, loss of revenue to acquirers (banks) and the payment processor, and potential disruption of a services provided by merchants to consumers/cardholders.

Accordingly, it is desirable to provide improvements to electronic commerce technology, and in particular, to recurring payment processing technology, where the improvements not only decrease the number of declined recurring transactions, but also increase detection of fraudulent recurring payment transactions.

BRIEF SUMMARY

Aspects of exemplary embodiments include a system for intelligent recurring transaction processing and fraud detection. The system comprises an artificial intelligence (AI) platform including machine learning (ML) models that are in communication with server computers. Software components of the servers access historical payment transaction data from a transaction database to train the ML models to predict future recurring transactions. The servers receive an authorization request from an acquirer for a payment transaction by a cardholder using a payment device, such as a payment card, process the authorization request to the issuer and transmit a response. Transaction data from the authorization request is input into the ML models to predict whether the payment transaction comprises a recurring payment transaction and if so, determine a predicted date of a next recurring transaction. An API call is initiated to the issuer with information regarding the next recurring payment transaction prior to the predicted date, and the issuer sends an alert message directly to the cardholder, e.g. if their issuer host system suggests this is an atypical transaction for the cardholder, or the cardholder has insufficient funds in their account to make the transaction.

According to the method and system disclosed herein, the AI platform generating an alert message that includes transactions attributes prior to the date of the next transaction provides both the issuer and the cardholder with additional intelligence to make a better authorization decision. Enabling the cardholder to verify, deny or indicate that the next recurring payment transaction is fraudulent results in a decrease in the number of declined recurring transactions, an increase in detection of fraudulent recurring payment transactions.

DETAILED DESCRIPTION

The exemplary embodiment relates to methods and systems for intelligent recurring transaction processing. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein.

The disclosed embodiments are directed to improvements in electronic commerce technology, and in particular, to recurring payment processing technology to both decrease the number of declined recurring transactions, and increasing detection of fraudulent recurring payment transactions by alerting issuers and cardholders about upcoming recurring payments and enabling the cardholder to take the appropriate action.

Figure 1:
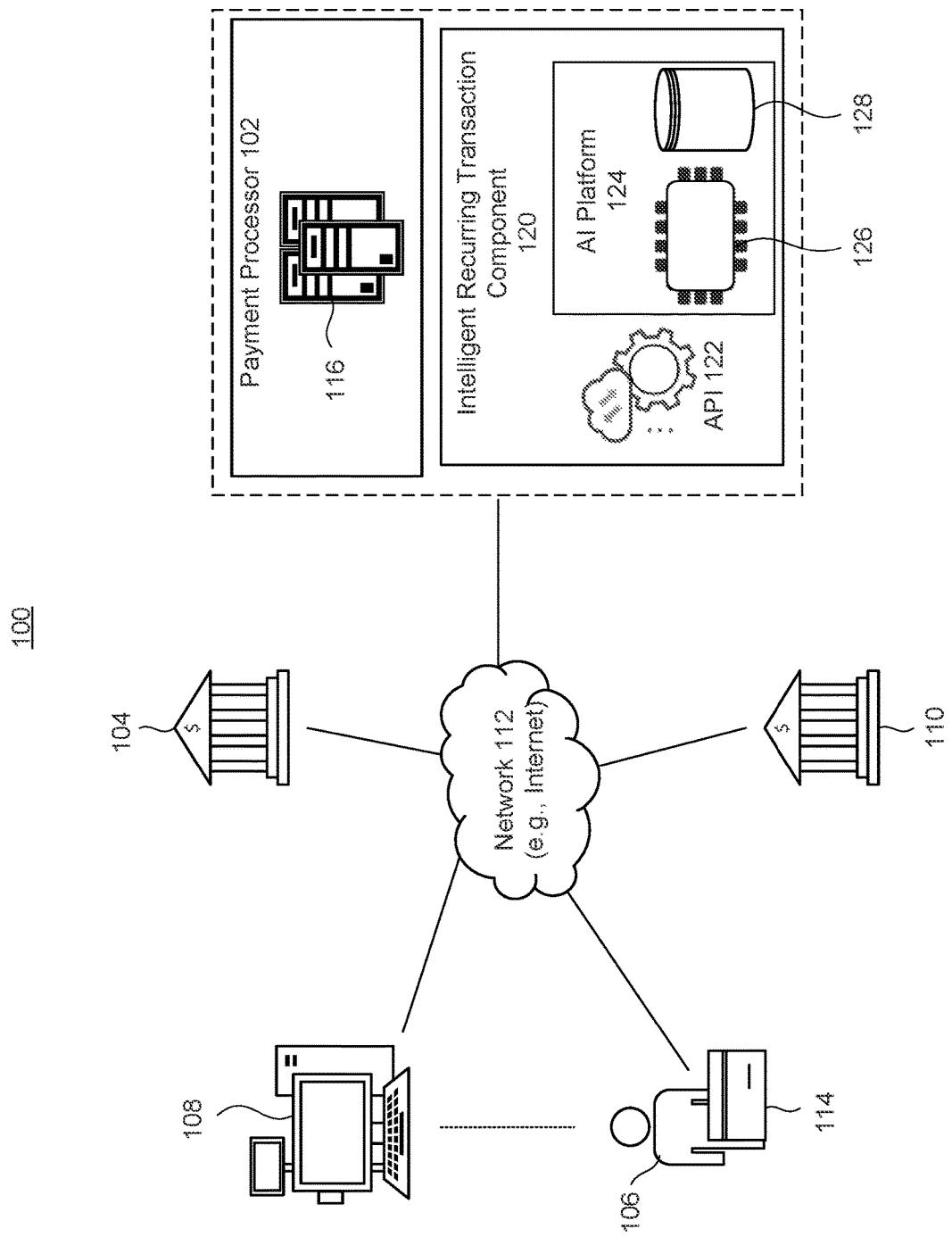
FIG. 1 is a block diagram illustrating an example network of payment processing system, according to some embodiments.

FIG. 1 is a block diagram illustrating an example network of a payment processing system, according to some embodiments. The payment system 100 includes systems/servers 116 of a payment processor 102 (e.g. VisaNet), an issuer 110, a merchant 108 a cardholder 106, and an acquirer 104 coupled with each other via one or more public and/or private networks (including e.g., the Internet) 112. As illustrated, in various embodiments, at least the one or more servers 116 of the payment processor 102 may execute aspects of an intelligent recurring transaction component and service 120, described further below.

The payment processor 102 may refer to an entity that receives transaction authorization requests from the merchant 108, and other entities and provides guarantees of payment, in some cases through an agreement between the payment processor 102 and the issuer 110. In some embodiments, an acquiring bank or acquirer 104 may forward the payment device details from the merchant 108 to the payment processor 102. Payment device transaction details sent over the network 112 are received by the one or more servers 116 of the payment processor 102 and processed, for example, by a payment authorization process, and/or forwarded to an issuer 106. Details of the payment device transaction may be stored as payment transaction records in a transaction database within or accessible to the servers 116 of the payment processor 102.

The servers 116 of the payment processor 102 may be organized into data processing subsystems, networks, and operations used to support and deliver payment related services (e.g., authentication services, authorization services, cardholder databases, and clearing and settlement services, etc.). The term server may refer to one or more computing devices, such as processors, storage devices, and/or similar computer components, that communicate with client devices and/or other computing devices over a network 112, such as the Internet or private networks and, in some examples, facilitate communication among other servers and/or client devices. For example, the server computer can be a large mainframe, a minicomputer cluster, or a group of servers functioning as a unit. In one example, the server computer may be a database server coupled to a Web server, and may include or be coupled to a database.

The issuer 110 or card issuer, may refer to one or more entities that provide payment accounts to cardholders (e.g., customers and the like) for conducting transactions, such as credit card payment transactions and/or debit card payment transactions. Typically, an issuer is a financial institution. The issuer 110 may provide an account or card identifier, such as a primary account number (PAN), to a customer that uniquely identifies one or more accounts associated with that customer. In some non-limiting embodiments, an issuer may be associated with a bank identification number (BIN) that uniquely identifies the issuer institution. As used herein, an issuer may also include reference to an "issuer system" (also known as a Card Management System) comprising one or more computer systems operated by or on behalf of an issuer executing one or more software applications. For example, an issuer system may include one or more authorization servers for authorizing a transaction.

The payment processor 102 is in communication with the issuer 110 and the merchant 108 (typically though an acquirer) via network 112, which may comprise a private network, such as VisaNet, or a public network, such as the Internet. As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively send information to the second unit. As another example, a first unit may be in communication with a second unit if at least one intermediary unit (e.g., a third unit located between the first unit and the second unit) processes information received from the first unit and sends the processed information to the second unit. In some non-limiting embodiments, a request or message may refer to a network packet (e.g., a data packet and/or the like) that includes data.

The merchant 108 may refer to one or more entities (e.g., operators of retail businesses) that provide goods and/or services, and/or access to goods and/or services, to a cardholder, based on a transaction, such as a payment transaction. As used herein "merchant" may refer to one or more computer systems operated by or on behalf of a merchant, such as a server executing one or more software applications. The merchant 108 may include a point-of-sale (POS)

device (not shown) that may be used by the merchant 106 to conduct and/or process transactions with cardholders.

The user or cardholder 106 is authorized to conduct transactions with the payment account provided by the issuer 110. The user/cardholder 106 can be, for example, the account owner of the account associated with a payment device 114, or an individual who is authorized to use the account on behalf of the account owner. The terms "cardholder" and "user" may be used interchangeably in the following description. The cardholder 106 initiates a transaction for goods/services of the merchant 108 using a payment device 114 associated with the payment account.

The payment device (or simply "card") 114 may be a physical device containing an account identifier associated with an account used for conducting transactions. Examples of a payment device 114 include a credit card, debit card, charge card, a smartcard or any combination thereof. As another example, the payment device may be associated to an electronic device that is used to conduct transactions, such as a mobile phone using a wallet application, smart media, a wristband, a machine-readable medium containing account information, a keychain device or fob, or an RFID transponder. The payment device 114 may include a volatile or a non-volatile memory to store information (e.g., an account identifier, a name of the account holder, and/or the like). In another embodiment, the payment device 114 may include the computer the cardholder 106 uses to enter account information into to make an online purchase from a website of the merchant 108. A "card present" or a "face-to-face (F2F)" transaction" refers to a transaction in which a cardholder 106 uses the payment device 114 to interact physically with a payment system, such as POS terminal.

In some non-limiting embodiments, the issuer 110 may provide an account identifier (e.g., a PAN, a token, and/or the like) to the cardholder 106 that uniquely identifies one or more accounts associated with that user. As used herein, the term "account identifier" may refer to one or more types of identifiers associated with an account (e.g., a PAN associated with an account, a card number associated with an account, a payment card number associated with an account, a token associated with an account, and/or the like). The account identifier may be embodied on the payment card and/or may be electronic information communicated to the user for use during electronic transactions. Account identifiers may be alphanumeric, any combination of characters and/or symbols, and/or the like.

Once the cardholder 106 presents the account identifier to the merchant 108 for a transaction, a computer of the merchant forwards the account identifier along with other transactional details, such as the payment amount, to the acquirer 104. As used herein, "acquiring" refers to functions supporting a merchant's needs in card payment acceptance, including POS terminals, software, card processing, dispute management and merchant customer service. The acquirer 104 may route transaction authorization requests to the payment processor 102. The transaction authorization request is an electronic message that is sent to request authorization for a transaction. The transaction authorization request can be sent, for example, to the payment processor 102 and/or the issuer 110 of the payment device.

After the payment processor 102 receives the transaction authorization requests, the payment processor 102 sends authorization data, e.g., payment authorization, to the appropriate issuer 110. The issuer 110 is configured to receive authorization data from the payment processor 102 (e.g., from an authorization server). Once the authorization data is received, the issuer 110 determines if the cardholder 106 is authorized to perform the given transaction (e.g., payment, cash deposit/withdrawal, money transfer, balance inquiries), and returns an authorization response message.

The authorization response message may be an electronic message reply to the transaction authorization request. The authorization response message may include, by way of example only, at least one of the following status indicators: Approval—transaction was approved; or Decline—transaction was not approved. The authorization response message may also include an authorization code, which may be a code that the issuer 106 returns in response to transaction authorization request in an electronic message (either directly or through the payment processor) to the merchant's POS device indicating approval of the transaction. The code may serve as proof of authorization.

Some portion of the cardholders 106 may have set up recurring payments on the payment device 114 by authorizing some of the merchants 108 to save payment account information as a "card on file" and to periodically charge the payment account. These charges are for recurring purchases of products or services in many different merchant sectors, such as subscription-type payments for cable subscriptions, movie and TV streaming services, Internet providers, mobile phone contracts, magazine subscriptions, club membership clubs, insurance premiums, and the like.

As described above, in conventional payment systems, as the number of recurring type payments has increased, the number of declines for this type of transaction has increased, resulting in the billions of lost clearing transactions and associated revenue for the payment processor 102. Millions of these declined recurring transactions were on accounts that were lost stolen or fraudulent.

According to the disclosed embodiments, the payment processor 102 further includes an intelligent recurring transaction component 120 that improves on conventional recurring payment transaction processing technology by providing the issuer 110 with data intelligence for alerting the cardholder 106 in advance of a recurring transaction event to reduce the number of declined recurring transactions.

This may be accomplished by processing and analyzing transactions through an artificial intelligence (AI) platform 124 to improve the ability of payment processor 102 to identify recurring transactions and key attributes thereof. In embodiments, the AI platform 124 may include at least one machine learning (ML) model 126 and a transaction database 128 comprising historical payment transaction data, as discussed further below. In addition, an application programming interface (API) 122 is implemented between the payment processor 102 and the issuer 110 to open a new communication channel between the AI platform 124 and the issuer 110. In one embodiment, the API 122 may be solely for communicating information relating to the recurring transactions.

Once a current transaction associated with a particular payment account of an issuer 110 is identified, the intelligent recurring transaction component 120 leverages AI and machine learning (ML) capabilities of the AI platform 124 to calculate a predicted date of one or more subsequent recurring transactions or whether the amount differs from previous recurring transactions. Data intelligence in the form of alerts are generated by the AI platform 124 and transmitted to the issuer 110 through API 122 for forwarding to the cardholder 106 prior to the occurrence of the subsequent recurring transaction. The update/alert given to the cardholder 106 may include sufficient information about the next recurring transaction to give the cardholder greater control over the authorization process, such as declining an unauthorized recurring transaction which they hadn't initiated or confirming with their issuer that they have set up a recurring payment with said merchant, which aids in identifying and reducing fraudulent transactions.

In embodiments, the intelligent recurring transaction component 120 and the AI platform 124 may be hosted or executed on one or more servers 116, but the intelligent recurring transaction component 120 and the AI platform 124 may be run on any type of one more computers that have memory and one or more processors. It should be understood that the functions of the intelligent recurring transaction component 120 and the AI platform 124 may be distributed over more than one server, and the functionality of the intelligent recurring transaction component 120 may be implemented using more than one software component.

Figure 2:
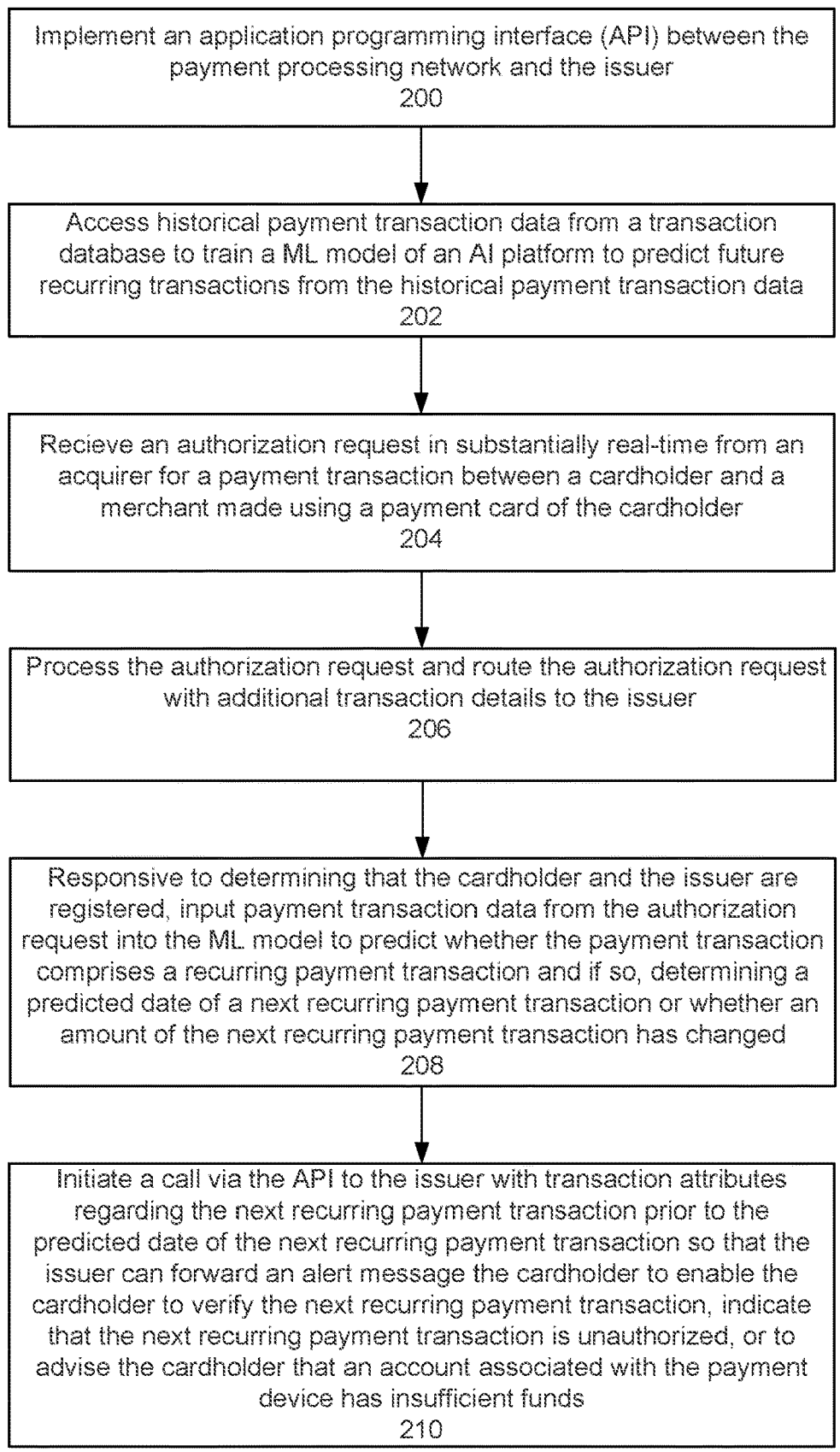
FIG. 2 is a flow diagram illustrating a process for intelligent recurring transaction processing.

FIG. 2 is a flow diagram illustrating a process for intelligent recurring transaction processing. The process may be implemented by the intelligent recurring transaction component 120 executing on an issuer computer, such as server 116. The process may begin by implementing an application programming interface (API) between the payment processing network and the issuer (block 200).

Historical payment transaction data is accessed from the transaction database 128 to train a machine learning (ML) model of the AI platform 124 to predict future recurring transactions from the historical payment transaction data (block 202).

An authorization request is received in substantially real-time from an acquirer 104 for a payment transaction between a cardholder 106 and a merchant 108 made using a payment device 114 of the cardholder 106 (block 204). An "authorization request message" may be an electronic message that is sent to request authorization for a transaction. An authorization request message can be sent, for example, to a payment processing network and/or an issuer of a payment device. An authorization request message according to some embodiments may comply with (International Organization of Standardization) ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV2 (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

The authorization request is processed by the payment processor 102 and the authorization request with additional transaction details is routed to the issuer 110 (block 206). In one embodiment, an authorization response indicating whether the transaction was approved or denied is subsequently received from the issuer 110 using a standard communication channel.

Responsive to determining that the cardholder 106 and the issuer 110 are registered members of the intelligent recurring transaction component 120, payment transaction data from the authorization request is input into the AI model 126 to predict whether the payment transaction comprises a recurring payment transaction and if so, determining a predicted date of a next recurring payment transaction or whether an amount of the next recurring payment transaction has changed (block 208).

A call is then initiated via the API to the issuer 110 with transaction attributes regarding the next recurring payment transaction prior to the predicted date of the next recurring payment transaction so that the issuer 110 can forward the information in an electronic alert message directly to the cardholder 106 to enable the cardholder to verify the next recurring payment transaction, to indicate that the next recurring payment transaction is unauthorized or fraudulent or to advise the cardholder that an account associated with the payment device 114 has insufficient funds to support the next recurring payment (block 210).

In one embodiment, the alert message may contain cardholder selectable links to response options about the next recurring transaction. For example, the alert message may contain response options such as "verify", "deny" or "fraudulent". The options may be displayed in the form of a prompt, selection box, or a link (e.g., a uniform resource locator (URL)) for the cardholder to enter/select an appropriate verification, denial and/or fraud response. In one embodiment, once entered by cardholder 106, a response message of the cardholder 106 may be received by the issuer 110. In one embodiment, the issuer 110 may forward the response message to the intelligent recurring transaction component 120 or the payment processor 102. In one embodiment, non-receipt of a response must within a predetermined period of time may be treated as a verification of the next recurring payment. In embodiments, the alert message and the response message may be sent through the cardholder's preferred communication channel, e.g., a text/SMS message, email, an automated phone call, or transmitted to/from an electronic wallet application of the issuer 110 running on a device of the cardholder, described further below.

In embodiments, the alert message may be generated to contain one or more of the transaction attributes regarding the next recurring payment transaction such as: an actual or estimated payment amount, an estimated payment due date, an ID or a description of the merchant, issuer contact information, financial recommendations, a merchant score or rating, transaction anomalies, or a combination thereof.

In one embodiment, the description of the merchant may further indicate whether the merchant's name has changed or has been reconciled with a normalized merchant name. In one embodiment, the merchant score may indicate whether the merchant is a well-known recurring merchant and whether the merchant sets up valid recurring events. Once received, the issuer 110 can use the merchant score to factor into the next authorization or into the content of the alert the issuer 110 sends to the cardholder 106. In embodiments, the merchant score may be calculated by accumulating "Approval:Decline" ratios of Transaction Counts/Amounts over a configurable historic period and by configurable mapping for assigning the merchant score in relation to the accumulated ratios.

In one embodiment, financial recommendations may include a projected balance of the user's account after payment is made, a cash flow analysis based on the current cash flow of the cardholder and the next recurring transaction, the recommendation to transfer funds into the account associated with the payment device, and anonymized statistics of other cardholders with similar recurring transactions. For example, an alert may be sent advising the cardholder that they have insufficient funds in their account to support the next recurring payment. In one embodiment this alert may be sent as a follow up message to a previous alert notifying the cardholder about the recurring payment.

In one embodiment, issuer contact information may include, for example, the intelligent recurring transaction component 120 identifying the issuer 110 associated with the payment device 114 used in the recurring transaction and inserting a contact link to the issuer 110 directly in the alert message. In another embodiment, the intelligent recurring transaction component 120 may send the alert message to the issuer 110 and the issuer 110 may electively insert their contact information into the alert prior to forwarding the alert to the cardholder 106.

In one embodiment, transaction anomalies may include i) a detected change in the transaction amount, particularly, if done without the cardholder's consent, ii) when the next recurring transaction occurs after completion of a subscription, or iii) where a new recurring payment is received from an unknown merchant.

According to the disclosed embodiments, the intelligent recurring transaction component 120 uses machine learning capabilities to deliver intelligence to issuers 110 and their cardholders 106 in advance of recurring transaction events, which provides advantages to the payment processor 102, to the issuers 110, and the cardholders 106. One advantage for the payment processor 102 is that the intelligent recurring transaction processing improves the identification or prediction of future recurring transactions over conventional systems. This, in turn, increases the rate at which cardholders 106 review and verify recurring transactions to ensure that potentially failed recurring transactions become approvals. It is estimated that the intelligent recurring transaction processing will increase recurring transaction approval rates from approximately 66% to 80%+, which is an improvement in electronic processing technology that has the potential to drive increased adoption of more recurring/direct debit type payments that are not conducted with payment devices today.

One advantage for issuers 110 is that the intelligent recurring transaction processing of the disclosed embodiments may help the issuers 110 identify fraud by, for example, sending an alert about a recurring transaction the cardholder is not expecting or did not sign up for. In addition sending an alert to the cardholder 106 that a recurring transaction event is about to occur, especially one that is not expected by the cardholder 106, should prompt a dialogue between the cardholder 106 and the issuer 110 using the issuer contact information in the alert. In addition, input by the cardholders 106 can help the issuers 110 identify lending possibilities, such as for example when the cardholder 106 has insufficient funds for the next recurring transaction, the issuer can insert links for financial assistance from the bank into the alert prior to transmission to the cardholder 106.

The ability of the intelligent recurring transaction component 120 to identify and advise the cardholders 106 through the issuers 110 that a recurring payment event is about to be processed or that the amount has changed can deliver greater value to cardholders 106. For example, by providing the ability for cardholders 106 to receive an alert in advance of recurring transaction event enables the cardholder 106 to have greater control over the authorization process. Such notification enables cardholders 106 to not only verify/deny a future recurring payment, but also ensure there is sufficient funds in their account. In addition, providing the cardholders 106 with additional information about the recurring transaction or the merchant may in some instance help the cardholders 106 recall and verify the recurring transaction, rather than mistakenly reject a transaction they do not remember.

Figure 3A:
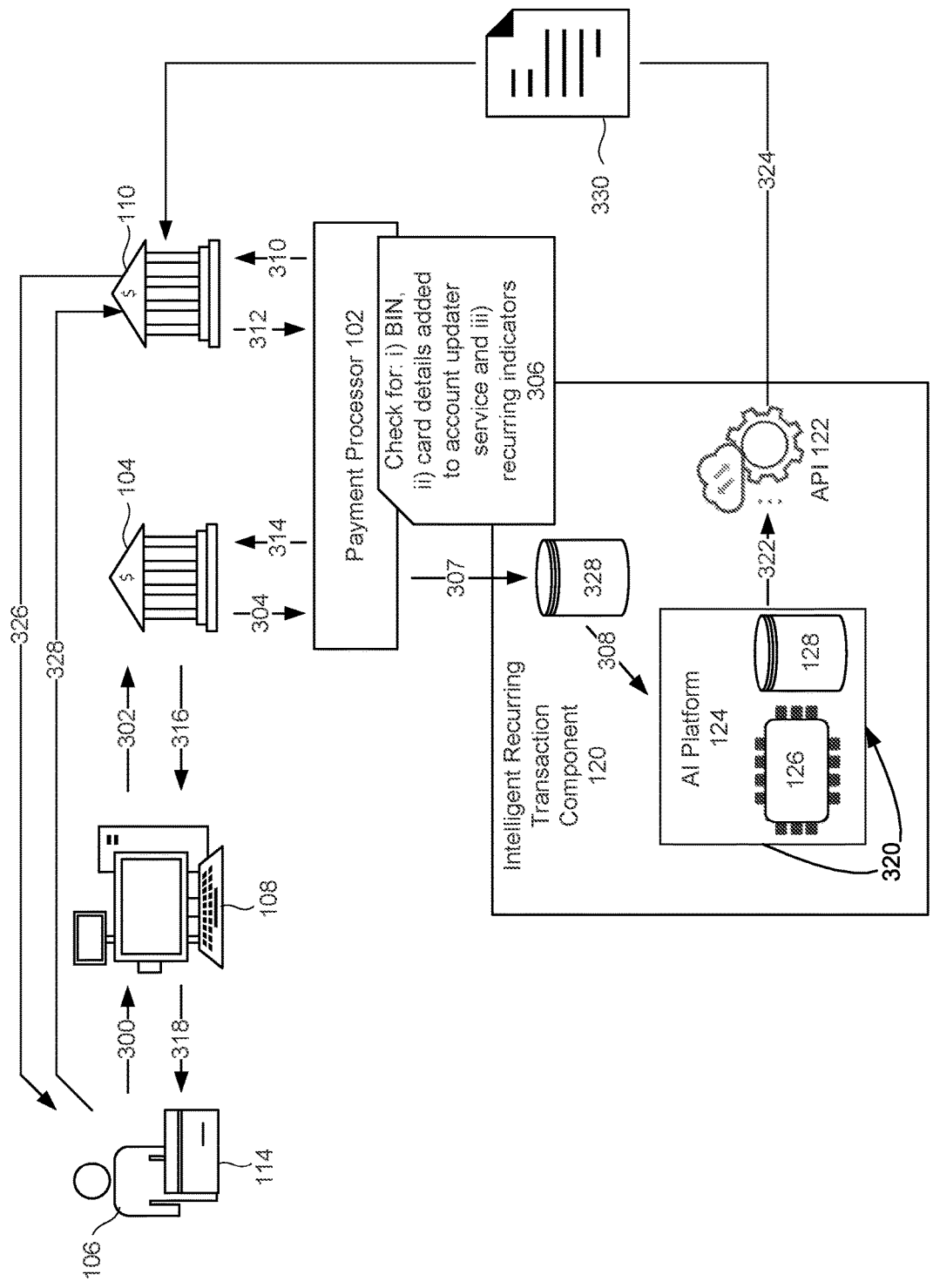
FIG. 3A is a block diagram illustrating the system and process for intelligent recurring transaction processing that improves on electronic commerce technology.

FIG. 3A is a block diagram illustrating the system and process for intelligent recurring transaction processing that improves on electronic commerce technology, where like components from FIG. 1 have like reference numerals. The process may begin with a registration phase in which the issuer 110 and optionally the cardholder 106 separately register as members of the service provided by the intelligent recurring transaction component 120.

Before or after registration, the cardholder 106 completes a purchase using the payment device 114 and selects a recurring payment option (e.g., a monthly subscription) either in person or on a website with the merchant 108 (line 300). The merchant 108 sets up the recurring payment using data from the payment device 114 supplied by the cardholder 106 and transmits the data to the acquirer 104 (line 302). The acquirer 104 sends an authorization request to the payment processor 102 for authorization (line 304). The authorization request may include a bank identification number (BIN) associated with the issuer 110, an issuer account identifier (e.g., a PAN) associated with the payment device 114 or payment account. The authorization request may also comprise "transaction information," including any information associated with a current transaction, such as the transaction amount, merchant identifier, merchant location, transaction date, etc., as well as any other information that may be utilized in determining whether to identify and/or authorize a transaction. For example, the authorization request may also include certain recurring transaction indicators.

The payment processor 102 receives the authorization request and performs initial validation checks 306. The initial validation checks 306 may include validating the BIN, the PAN and determining whether details associated the payment device 114 has been added to an account updater service (e.g., the Visa account updater VAU and the MasterCard automated billing updater (ABU)). The account updater service is a platform that enables issuers to communicate changes in the cardholder account information through the payment processor 102, which may include updating card numbers, expiry dates and stop advices. Participating issuers 110 provide a history of account detail changes to a central database and update the records periodically. If the card details have been added to the account updater service and the PAN is listed in the account updater as being updated, the payment processor 102 may automatically swap out the old PAN with the updated PAN, e.g., using the Auto VAU Service, before forwarding the authorization request to the issuer 110.

If the above checks are verified, then the payment processor 102 carries on the basic processing and routing determination. For example, the payment processor 102 may allocate a processing category, including for transactions above the issuer limit; determine if the issuer is available for routing the authorization request; and perform a CVV2 check to determine if the issuer option is to have the payment processor 102 is to perform the authorization validation.

The payment processor 102 further checks if the authorization request includes any recurring transactions indicators. For example, the payment processor 102 may check if the recurring transaction includes any recurring identifier parameters. For example, some types of authorization messages may include a parameter for indicating the POS environment type (e.g., field 126.13), where a value of "R" indicates recurring and "I" indicates installment. Some types of authorization messages may include a mail/phone/electronic commerce and payment indicator (e.g., field 60.8), where a value of "02" indicates recurring and a value of "03" indicates installment. If the authorization request includes any recurring transaction indicators, then the payment processor 102 forwards the transaction details to a consolidated transaction log 328 (line 307). The consolidated transaction log 328 may store authorization and clearing/settlement transaction data and may reformat the transaction data for distribution to downstream systems.

The AI platform 124 monitors the consolidated transaction log 328 and retrieves the entry of the newly added transaction details having recurring indicators. The AI platform 124 may search for the issuer BIN and the PAN in a registration database to determine if the issuer and/or the cardholder 106 are registered members of the service provided by the intelligent recurring transaction component 120. If so, the AI platform 124 may log the recurring transaction as a first recurring transaction for the participating issuer BIN and PAN (line 308).

Thereafter, the payment processor 102 continues with processing the transaction and routes an authorization request with transaction details to the issuer 110 based on normal processing rules (line 310). The issuer 110 makes an authorization decision based on the data in the authorization request, e.g., recurring indicators, CVV2 result, cardholder balance, fraud likeness score and the like. The payment processor 102 receives the authorization response from the issuer 110 (line 312) and forwards the authorization response to the acquirer 104 (line 314). The acquirer 104 transmits the authorization response to the merchant 108 (line 316). The merchant 108 then advises the cardholder 106 of the authorization decision (line 318), e.g., Approval or Decline.

According to the disclosed embodiments, the AI platform 124 inputs the transaction details to one or more trained ML models 126 to calculate a predicted date of the next recurring transaction associated with the first recurring transaction (line 320). The ML models 126 may be used to determine or estimate other attributes about the next recurring payment transaction including an actual or estimated recurring transaction amount, a reconciled ID or a description of the merchant, issuer contact information, financial recommendations, transaction anomalies, a merchant score or rating, or a combination thereof.

The AI platform 124 then initiates a call to the API 122 (line 322) for the API 122 to send an alert message 330 to the issuer 110 containing information about the next recurring transaction prior to the predicted date of the next recurring payment transaction (line 324). Embodiments, the API call can be a PUSH or a PULL type call. During or after registration, the issuer 110 can subscribe to one or more of the APIs 122. The AI platform 124 then initiates the call to the API 122 for the API 122 to push/pull to/from the issuer 110 the alert message 330.

In one embodiment, during a PUSH API, the alert message 330 may comprise a notification of a next recurring transaction event. The alert message 330 may include the BIN, the PAN, a date of the last and next recurring transaction event for the PAN, an amount of the next recurring transaction, the number of X of Y recurring transaction events set up, a reconciled merchant name, the merchant score or rating, a request to verify/deny the transaction, issuer contact information, financial recommendations, transaction anomalies, or any combination thereof. Some of the above attributes may be inserted into the alert message 330 by the issuer 110 prior to forwarding the alert message 330 to the cardholder 106.

In one embodiment, during a PULL API, the issuer 110 inputs a PAN to query or request all known recurring transaction events connected with the PAN. The data returned via the PULL API may include the number of recurring transactions set up for the given PAN and merchant pairings. The issuer 110 may also input a PAN and a merchant ID to request data regarding the last recurring transaction event for that specific merchant.

The issuer receives the alert message 330 via API 122 for the PAN with details of the upcoming recurring transaction event. A card management system (CMS) of the issuer 110 may update the cardholder's account with the details of the next recurring transaction for the merchant and records the expected date to receive the recurring transaction event. The issuer 110 may edit the alert message 330 to add/subtract information as desired and then forwards the alert to 30 to the cardholder 106 using the cardholder's preferred communication channel (line 326). The cardholder 106 responds with feedback by selecting to either verify or deny the transaction and in one embodiment the response is sent directly to the issuer 110 (line 328). The issuer 110 can use the cardholder feedback to take an action, such as updating a risk model. The cardholder 106 may also click on a link to contact information to initiate a call, chat session, or email to the issuer 110 in case there are questions about the next recurring payment.

The above process describes processing by the intelligent transaction component 120 upon receipt of a first recurring transaction between the cardholder 106, payment device 114 and merchant 108 for a particular item/service in which the issuer is provided with an alert message 330 prior to the subsequent recurring transaction. Once the merchant initiates an authorization request for the subsequent recurring transaction, processing proceeds as described above until the issuer 110 receives the authorization request (line 310). According to the disclosed embodiments, however, the issuer 110 makes an authorization decision for the subsequent recurring transaction based not only on the data in the authorization request, e.g., recurring indicators, CVV2 result, and the like, but also by using the data from the alert message 330 and (optionally) the verification or denial by the cardholder 106. As the issuer 110 is expecting the authorization request from the merchant 108, and the cardholder's account is in good standing and the cardholder is expecting the recurring event, the issuer 110 approves the subsequent recurring transaction event, and forwards the authorization response to the merchant 108 (line 316).

Accordingly, the intelligent recurring transaction processing of the disclosed embodiments enables the payment processor 102 to perform functions the payment processor 102 could not have previously performed, which include improving efficiency of the overall system to receive approvals for valid recurring transactions the first time that a specific recurring event is received, and providing both the issuer 110 and the cardholder 106 with intelligence (additional data) to make improved authorization decisions. For example, the intelligent recurring transaction component 120 is configured to identify and select attributes/parameters associated with the recurring transaction that are more important to the issuer decision-making process, which improves accuracy of the authorization process.

Figure 3B:
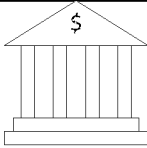
FIG. 3B is a diagram illustrating an example of an alert notification screen of for a next recurring transaction displayed on an electronic device to the cardholder to verify/deny the transaction.

FIG. 3B is a diagram illustrating an example of an alert notification screen of the next recurring transaction 350 displayed on an electronic device to the cardholder to verify/deny the transaction. In embodiments, the alert notification of next recurring transaction screen 350 (hereinafter notification screen 350) may be displayed on a computer or mobile device of the cardholder 106. For example, the notification screen 350 may be displayed as part of a website of the issuer 110 on a computer or as part of a digital wallet running on a payment device, such as a mobile phone, of the cardholder 106. In the example shown, the notification screen 350 is displayed by a digital wallet of the issuer 102, e.g., FDNB Bank, but would include similar content if displayed in a web application. A digital wallet, also referred to as an "electronic wallet," "electronic wallet mobile application," and "digital wallet," is a software application configured to facilitate and/or conduct transactions. The digital wallet may display and transmit account identifiers or representations of the account identifiers (e.g., tokens), on behalf of accounts of the cardholder 106 to facilitate payments at more than one unrelated merchant, perform person-to-person payments, or load financial value into the digital wallet. In one embodiment, the issuer 110 may make the electronic wallet available to cardholders of the issuer 110. In another embodiment, a third party may be the electronic wallet provider. Examples of third-party electronic wallets may include, but are not limited to, Google Wallet™, Android Pay®, Apple Pay®, and Samsung Pay®.

In the example shown, the cardholder 106 has opened the notification screen 350. In the example shown, the notification screen 350 may be populated with transaction information 352, cardholder authorization options 356, and cardholder account information 358. The transaction information 352 may include, but is not limited to, a portion of the PAN or other account identifier, the next recurring transaction amount, the previous transaction amount, a warning indication 360 when there is difference in the two amounts, the original merchant name (which in many cases is not descriptive), a reconciled merchant name (which is descriptive), and a merchant recurring transaction score.

The cardholder authorization options 356 may include user controls (e.g. check boxes, buttons, dials, links) for selecting to verify the next recurring transaction or to deny the next recurring transaction. There may also be an option to indicate that the transaction is suspected as being fraudulent. In the case where the cardholder is unsure or has questions, the issuer's contact information may be displayed or made available such as in the form of a clickable link 362.

The cardholder account information 358 may include, but is not limited to, a current account balance, a projected balance on the date the next recurring transaction is due, and a suggestion or recommendation to transfer money into the account to be charged. A link 364 may be provided for the cardholder 106 to navigate to a transfer money page/screen to do so.

Figure 4:
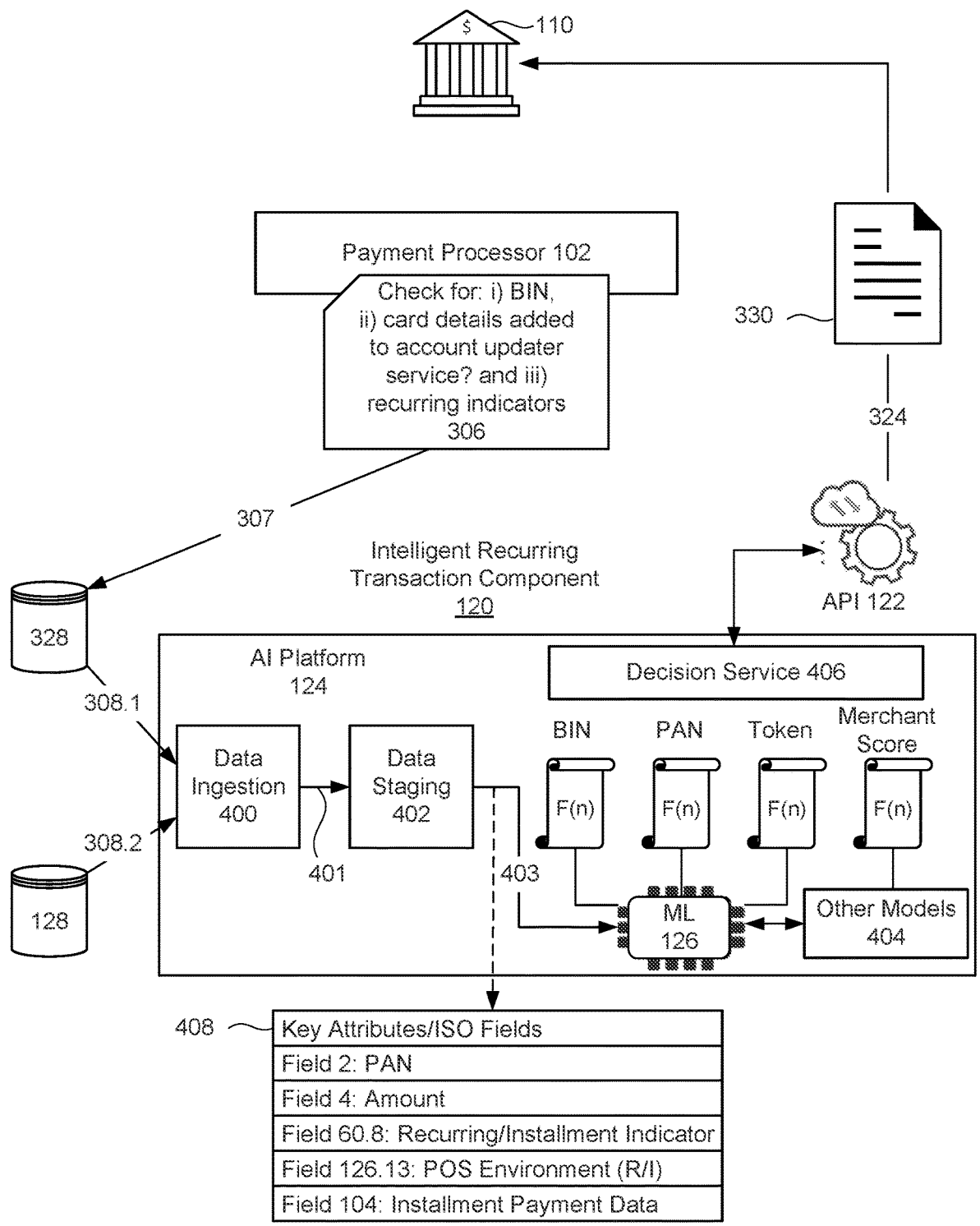
FIG. 4 is a diagram illustrating processing by the AI platform of the intelligent recurring transaction component in further detail.

FIG. 4 is a diagram illustrating processing by the AI platform 124 of the intelligent recurring transaction component 120 in further detail, where like components from FIG. 3A have like reference numerals. In one embodiment, the AI platform 124 may comprise a data ingestion component 400, a data storage component 402, ML models 126, other ML models 404 and a decision service component 406.

The processing is described from the point where the payment processor 102 forwards recurring transaction details to the consolidated transaction log 328 after performing initial checks (line 307). The data ingestion component 400 captures recurring transactions using recurring indicators from transaction data details, and may validate the merchant name and PAN, and allocate a suitable transaction frequency pattern (a plan), i.e., how often has this recurring event been seen previously (e.g. using historical data from the payment processor's transaction databases) or if this is the first in a string of recurring events. In which case a higher probability pattern (e.g. monthly, bi-weekly, annual) is allocated based on historical data seen for a merchant. During processing, the data ingestion component 400 ingests the real-time entry of the newly added transaction details having recurring indicators (line 308.1) from the CTL 328 and ingests historical payment transaction data from the transaction database 128. The data ingestion component 400 processes the input data and filters out data necessary to build recurring transactions (e.g., those attributes described in 408), which are forwarded to the data stage and component 402 (line 308.2) and stored e.g., under a recurring transaction key/identifier.

The data staging component 402 streams recurring attributes of the recurring transactions to the machine learning models 126 (line 401). In embodiments, the data staging component 402 processes the recurring transaction attributes and outputs a list of key attributes/ISO-fields 408 to ML models 126 for recurring transactions (line 403). In one embodiment, the list of key attributes may correspond to fields defined in a standard for financial card messaging, such as ISO 8583 or 20022. In one embodiment, the list of key attributes may include a PAN, transaction amount, a recurring/installment indicator, a POS environment, and installment payment data.

According to some embodiments, the ML models 126 operates according to three scenarios. The first scenario is to process first recurring transactions of PANs for participating issuers. The second scenario is to process all subsequent transactions for those PANs. The AI platform 124 starts by training the ML models for newly generated recurring transactions for given PANs or tokens. In one embodiment, the recurring ML models 126 may model recurring transaction attributes such as the BIN, PAN, token, and merchant score, for example, and may involve processing by other algorithms (not shown) and other ML models 404. For subsequent transactions, the AI platform 124 continues to train the ML models 126 for participating issuers. The ML models 126 generates a match for each recurring event and stores them as separate transactions with unique transaction characteristics. Each recurring event is checked against historical events to determine if the event fits in with a previous chain or is a new recurring transaction event. Issuers can also make use of an alert/merchant score to layer in any additional products like lending, installment as they see fit.

The third scenario occurs when a ML model expires or is completed, such as when the issuer 110 unsubscribes from the intelligent recurring transaction service. Upon an issuer unsubscribe event, issuer data incorporated into the ML models will be completed/retired or purged. In one embodiment, the ML models 126 may be indexed based on participating issuer BINs, PANs, and tokens, for querying by the decision service component 406.

The decision service component 406 may analyze the real time recurring transactions and use the ML 126 models to perform one or more of: predicting the next recurring transaction date, determining whether an amount of the next recurring payment transaction is different than the previous amount, estimating the amount, reconciling the merchant name, and calculating the merchant recurring transaction score. In some embodiments, the decision service component 406 may be configured to access cardholder bank account information stored by the issuer using the same or different APIs as API 124 to calculate a projected balance as of the due date of the next recurring transaction and to provide advice to transfer addition funds if necessary. Using the predicted next recurring transaction date, the decision service component 406 may also determine a date (e.g., 1 week, 3 days, or 1 day prior) to generate and send the alert message 330 to the issuer via call of API 122 in a PUSH/PULL manner (line 324). The decision service 2406 may post process results by writing contents of the alert message 330 to a database, logging transmission of the alert message 330, and monitoring ML model performance.

Use of the AI platform may speed performance by providing the issuer with additional information about the merchant (e.g. merchant score), advising information about the series of recurring events, previous authorization decisions by the issuer for his cardholder at this merchant, etc., that the issuer can use to either contact the cardholder (as required) or plug into their card management system to assist with their processing of the authorization request.

Figure 5:
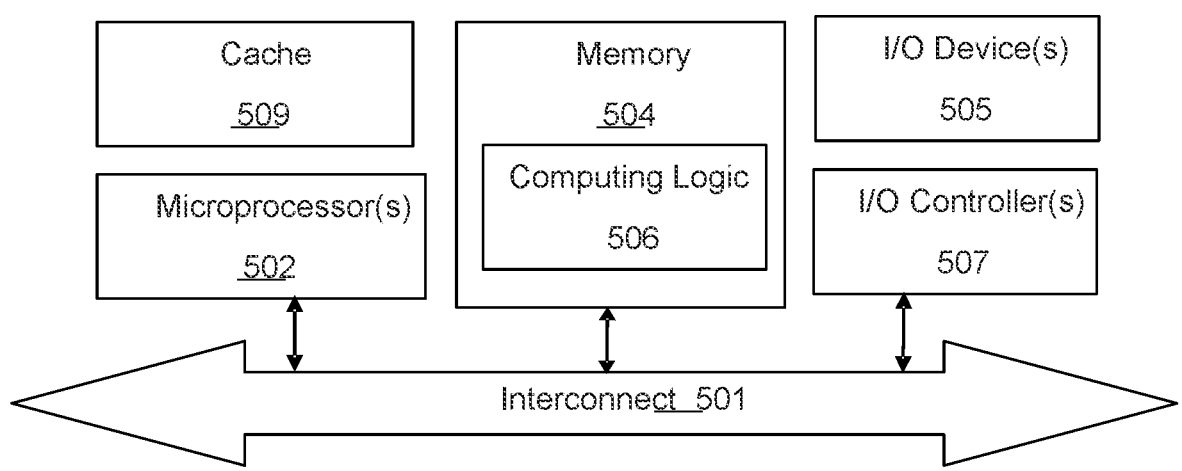
FIG. 5 shows an implementation of a computer system that may be applicable to computing devices of the issuer, the payment processing network, merchant and/or a payment device.

FIG. 5 shows an implementation of a computer system 500 that may be applicable to computing devices of the issuer 110, the payment processing network 102, merchant 108 and/or the payment device 114. According to an embodiment. The computer system 500 can include a microprocessor(s) 502 and memory 504. In an embodiment, the microprocessor(s) 502 and memory 504 can be connected by an interconnect 501 (e.g., bus and system core logic). In addition, the microprocessor 503 can be coupled to cache memory 509. In an embodiment, the interconnect 501 can connect the microprocessor(s) 502 and the memory 504 to input/output (I/O) device(s) 505 via I/O controller(s) 507. I/O devices 505 can include a display device and/or peripheral devices, such as mice, keyboards, modems, network interfaces, printers, scanners, video cameras and other devices known in the art. In an embodiment, (e.g., when the data processing system is a server system) some of the I/O devices (505), such as printers, scanners, mice, and/or keyboards, can be optional.

In an embodiment, the interconnect 501 can include one or more buses connected to one another through various bridges, controllers and/or adapters. In one embodiment, the I/O controllers 507 can include a USB (Universal Serial Bus) adapter for controlling USB peripherals, and/or an IEEE-1394 bus adapter for controlling IEEE-1394 peripherals.

In an embodiment, the memory 502 can include one or more of: ROM (Read Only Memory), volatile RAM (Random Access Memory), and non-volatile memory, such as hard drive, flash memory, etc. Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of the present disclosure.

A method and system for intelligent recurring transaction processing has been disclosed. The present invention has been described in accordance with the embodiments shown, there could be variations to the embodiments, and any variations would be within the spirit and scope of the present invention. Accordingly, many modifications may be made by one of ordinary skill in the art without departing from the spirit and scope of the appended claims.

We claim:

1. A system to improve computer processing of recurring payment transactions that decreases the number of declined recurring payment transactions, and increases detection of fraudulent recurring payment transaction, comprising:
   an artificial intelligence (AI) platform including one or more machine learning (ML) models;
   one or more server computers each having a processor coupled to a memory and in electronic communication with the AI platform, the one or more servers comprising a payment processor for processing the recurring payment transactions, wherein the payment processor is in electronic communication, via a network, with a merchant's computing device, an issuer's computing device, an acquirer's computing device, and a cardholder's mobile computing device, the cardholder's computing device comprising a display;
an application programming interface (API) implemented between the payment processor and the issuer to open an electronic communication channel between the AI platform and the issuer; and
one or more software components executed by the one or more server computers that are configured to:
access historical payment transaction data from a transaction database to train the one or more ML models to predict future recurring transactions from the historical payment transaction data;
receive an authorization request in substantially real-time from the acquirer for a current payment transaction between the cardholder and the merchant made using a payment device of the cardholder;
process and route the authorization request with additional transaction details to the issuer;
determine that the cardholder and the issuer are registered as members of a service provided by the payment processor;
responsive to determining that the cardholder and the issuer are registered, input payment transaction data from the authorization request into the one or more ML models to determine whether the payment transaction comprises a recurring payment transaction and if so, determining a predicted date of a next recurring payment transaction and whether an amount of the next recurring payment transaction has changed;
determine transaction attributes about the next recurring payment transaction, the transaction attributes including: an actual or estimated recurring transaction amount, an estimated payment due date, financial recommendations regarding the risk of insufficient funds to make the recurring payment, an indicator of a merchant name, a merchant score or rating indicating whether the merchant is a well-known recurring merchant, transaction anomalies, or a combination thereof;
generate an alert message including the transaction attributes regarding the next recurring payment transaction prior to the predicted date of the next recurring payment transaction, the alert message further comprising selectable links to response options about the next recurring payment transaction and to open a dialog with the issuer;
initiate a call via the API to the issuer so that the issuer can forward the alert message directly to the cardholder to enable the cardholder to verify the next recurring payment transaction, to indicate that the next recurring payment transaction is unauthorized or fraudulent, or to advise the cardholder that an account associated with the payment device has insufficient funds to support the next recurring payment, wherein the alert message is configured to be displayed in an interface on the display of the cardholder mobile computing device to enable a response message from the cardholder; and
receive from the issuer the response message received by the issuer from the cardholder, wherein non-receipt of a response message by the cardholder is treated as verification of the next recurring payment transaction.

2. The system of claim 1, wherein the financial recommendations include one or more of a projected balance of the user's account after payment is made, a cash flow analysis based on the current cash flow of the cardholder and the next recurring transaction, a recommendation to transfer funds into the account associated with the payment device, and anonymized statistics of other cardholders with similar recurring transactions.

3. The system of claim 1, wherein the transaction anomalies comprise i) a detected change in a transaction amount, ii) when the next recurring transaction occurs after completion of a subscription, or iii) where a new recurring payment is received from an unknown merchant.

4. The system of claim 1, wherein the alert message includes response options including "verify", "deny", "fraudulent" or any combination thereof.

5. A computer-implemented method for improving computer processing of recurring payment transactions by a payment processing network, the method decreasing the number of declined recurring payment transactions, and increasing detection of fraudulent recurring payment transactions, comprising:
implementing an artificial intelligence (AI) platform including one or more machine learning (ML) models executed by one or more servers each having a processor coupled to a memory, the one or more servers comprising a payment processor for processing the recurring payment transactions, wherein the payment processor is in electronic communication, via a network, with a merchant's computing device, an issuer's computing device, an acquirer's computing device, and a cardholder's mobile computing device, the cardholder's computing device comprising a display;
implementing an application programming interface (API) between the payment processing network and the issuer to open an electronic communication channel between the AI platform and the issuer, the one or more servers executing instructions for:
accessing historical payment transaction data from a transaction database to train the one or more ML models to predict future recurring transactions from the historical payment transaction data;
receiving an authorization request in substantially real-time from an-the acquirer for a current payment transaction between the cardholder and the merchant made using a payment device of the cardholder;
processing and routing the authorization request with additional transactional details to the issuer, and receive an authorization response;
determining that the cardholder and the issuer are registered as members of a service provided by the payment processing network;
responsive to determining that the cardholder and the issuer are registered, inputting payment transaction data from the authorization request into the ML model to predict whether the payment transaction comprises a recurring payment transaction and if so, determining a predicted date of a next recurring payment transaction or whether an amount of the next recurring payment transaction has changed;
determining transaction attributes about the next recurring payment transaction, the transaction attributes including: an actual or estimated recurring transaction amount, an estimated payment due date, financial recommendations regarding the risk of insufficient funds to make the recurring payment, an indicator of a merchant name, a merchant score or rating indicating whether the merchant is a well-known recurring merchant, transaction anomalies, or a combination thereof;

generating an alert message including the transaction attributes regarding the next recurring payment transaction prior to the predicted date of the next recurring payment transaction, the alert message further comprising selectable links to response options about the next recurring payment transaction and to open a dialog with the issuer;

initiating a call via the API to the issuer so that the issuer can forward the alert message directly to the cardholder to enable the cardholder to verify the next recurring payment transaction, to indicate that the next recurring payment transaction is unauthorized or fraudulent, or to advise the cardholder that an account associated with the payment device has insufficient funds to support the next recurring payment, wherein the alert message is configured to be displayed in an interface on the display of the cardholder mobile computing device to enable a response message from the cardholder; and receiving from the issuer the response message received by the issuer from the cardholder, wherein non-receipt of a response message by the cardholder is treated as verification of the next recurring payment transaction.

6. The computer-implemented method of claim 5, further comprising: including as the financial recommendations one or more of a projected balance of the user's account after payment is made, a cash flow analysis based on the current cash flow of the cardholder and the next recurring transaction, a recommendation to transfer funds into the account associated with the payment device, and anonymized statistics of other cardholders with similar recurring transactions.

7. The computer-implemented method of claim 5, further comprising: including as the transaction anomalies i) a detected change in a transaction amount, ii) when the next recurring transaction occurs after completion of a subscription, or iii) where a new recurring payment is received from an unknown merchant.

8. The computer-implemented method of claim 5, further comprising: including in the alert message response options including "verify", "deny", "fraudulent" or any combination thereof.

9. The computer-implemented method of claim 5, wherein the alert message and the response message are sent to the cardholder's preferred communication channel.

10. A non-transitory computer readable medium having stored thereon instructions to improve computer processing of recurring transaction payments by a payment processing network that decreases the number of declined recurring payment transactions, and increasing detection fraudulent recurring payment transactions, the instructions when executed by a processor of a computer, cause the computer to:

implement an artificial intelligence (AI) platform including one or more machine learning (ML) models executed by the processor coupled to a memory, the processor for processing the recurring payment transactions, wherein the processor is in electronic communication, via a network, with a merchant's computing device, an issuer's computing device, an acquirer's computing device, and a cardholder's mobile computing device, the cardholder's computing device comprising a display;

implement an application programming interface (API) between the payment processing network and the issuer to open an electronic communication channel between the AI platform and the issuer, the instructions executed by the processor further configured to:

access historical payment transaction data from a transaction database to train the one or more ML models to predict future recurring transactions from the historical payment transaction data;

receive an authorization request in substantially real-time from the acquirer for a current payment transaction between the cardholder and the merchant made using a payment device of the cardholder;

process and route the authorization request with additional transaction details to the issuer and receive an authorization response;

determine that the cardholder and the issuer are registered as members of a service provided by the payment processing network;

responsive to determining that the cardholder and the issuer are registered, input payment transaction data from the authorization request into the ML model to predict whether the payment transaction comprises a recurring payment transaction and if so, determining a predicted date of a next recurring payment transaction or whether an amount of the next recurring payment transaction has changed;

determining transaction attributes about the next recurring payment transaction, the transaction attributes including: an actual or estimated recurring transaction amount, an estimated payment due date, financial recommendations regarding the risk of insufficient funds to make the recurring payment, an indicator of a merchant name, a merchant score or rating indicating whether the merchant is a well-known recurring merchant, transaction anomalies, or a combination thereof;

generate an alert message including the transaction attributes regarding the next recurring payment transaction prior to the predicted date of the next recurring payment transaction, the alert message further comprising selectable links to response options about the next recurring payment transaction and to open a dialog with the issuer;

initiate a call via the API to the issuer so that the issuer can forward the alert message directly to the cardholder to enable the cardholder to verify the next recurring payment transaction, to indicate that the next recurring payment transaction is unauthorized or fraudulent, or to advise the cardholder that an account associated with the payment device has insufficient funds to support the next recurring payment, wherein the alert message is configured to be displayed in an interface on the display of the cardholder mobile computing device to enable a response message from the cardholder; and receive from the issuer the response message received by the issuer from the cardholder, wherein non-receipt of a response message by the cardholder is treated as verification of the next recurring payment transaction.

11. The non-transitory computer readable medium of claim 10, further comprising: including as the financial recommendations one or more of a projected balance of the user's account after payment is made, a cash flow analysis based on the current cash flow of the cardholder and the next recurring transaction, a recommendation to transfer funds into the account associated with the payment device, and anonymized statistics of other cardholders with similar recurring transactions.

12. The non-transitory computer readable medium of claim 10, further comprising: including as the transaction anomalies i) a detected change in a transaction amount, ii) when the next recurring transaction occurs after completion of a subscription, or iii) where a new recurring payment is received from an unknown merchant.

13. The non-transitory computer readable medium of claim 10, further comprising: including in the alert message response options including "verify", "deny", "fraudulent" or any combination thereof.

14. The non-transitory computer readable medium of claim 10, wherein the alert message and the response message are sent to the cardholder's preferred communication channel.

* * * * *